March 16, 1965     D. C. HEITSHU     3,173,400
DUMPING STOCK FEEDER
Filed Aug. 29, 1963

INVENTOR.
DANIEL C. HEITSHU
BY
*ATTORNEY*

3,173,400
DUMPING STOCK FEEDER
Daniel C. Heitshu, Shippensburg, Pa., assignor to Sperry Rand Corporation, New Holland, Pa., a corporation of Delaware
Filed Aug. 29, 1963, Ser. No. 305,278
3 Claims. (Cl. 119—56)

This invention relates to devices for mechanically delivering feed to hogs and other stock animals. More particularly, the invention relates to an improvement in stock feeders of the fill and dump type operative to deliver feed simultaneously to a plurality of stock animals.

Heretofore, a stock feeder has been provided comprising an elongated, horizontally extending, rotatable container. The container is made up of interconnected sections, each being ten feet long, for example. Operative in the container is a conveyor in the form of an auger which receives feed from a supply hopper and distributes the feed throughout the length of the container. The container has a longitudinal discharge opening, which extends substantially the full length of the container and is adapted to be positioned in an "up" twelve o'clock location while feed is being conveyed and distributed and moved to a "down" six o'clock location to discharge feed. After the feed has been dumped, the opening is returned to its starting position so that the container may again receive feed and begin another fill and dump cycle.

To insure uniform distribution of feed throughout the length of the device, the feed is continuously and uniformly metered to the conveying auger. The feed becomes deposited between the flights of the auger and each successive flight receives the same amount of material. However, the auger produces a certain amount of tapering of the feed supplied to it. Tapering is a problem when the feed installation is quite long. The problem is not significant over moderate distances. Tapering results when a portion of the feed being pushed ahead by a particular auger flight escapes and falls back with each rotation of the auger. As the terminal sections of the feeder are reached, the quantity of feed becomes less. Thus, when a dumping takes place, the remote feeder sections deposit somewhat less feed than the other sections.

One object of this invention is to provide a stock feeder of the character described wherein during each dumping, a quantity of feed is accumulated from the supply hopper to provide a change of material to be conveyed by the auger at the head of a stream and serving to reduce tapering of feed at the remote feeder sections.

Another object of this invention is to provide a stock feeder of the character described wherein metering means in a discharge hopper operates continuously while the deposit of feed in a container is noncontinuous, a quantity of feed being built during each dumping of the feeder to provide an initial charge of material for the next fill and dump cycle.

A further object of this invention is to provide a stock feeder of the character described wherein the accumulation of a feed charge between successive dumping operations is accomplished by a structure which is simple and inexpensively designed.

Other objects of this invention will be apparent hereinafter from the specification and from the recital in the appended claims.

Figure 1:
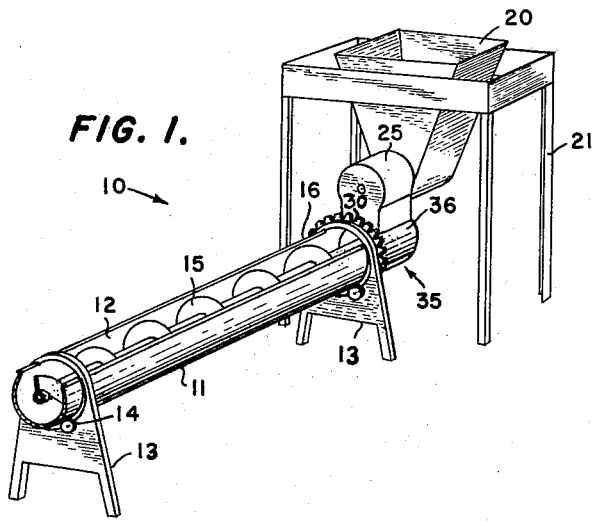
FIG. 1 is a perspective view of a stock feeder constructed according to this invention.

Referring now to the drawing by numerals of reference, 10 denotes generally a fill and dump stock feeder having a horizontally extending container 11 generally U-shaped in cross section and forming a longitudinal rectilinear discharge opening 12. Container 11 is rotatably carried on support stands 13 having rollers 14 engaging the periphery of the container. Normally, container 11 is rotatably positioned at-rest, with its opening 12 in an "up" 12 o'clock position. When so located, feed is adapted to be conveyed and distributed throughout the length of the container by an auger 15 supported within the container.

Adjacent one end 16 of container 11, a feed supply hopper is provided and mounted on a support structure 21. Hopper 20 has a bottom discharge opening 22 through which feed is adapted to be withdrawn by metering means in the form of auger 24 located at the hopper bottom. Interposed between hopper 20 and container 11 is a valve box 25 having an inlet at 26 communicating with metering auger 24 and a discharge outlet 28 communicating with auger 15.

For rotating container 11, a drive sprocket 30 is provided and welded or otherwise affixed to the container. Part of sprocket 30 is made up of the inner race 31 of a bearing, the outer race 32 of which is attached to box 25. Container 11 is free to rotate relative to box 25 and to the support stands 13.

The auger 15 is rotated by a drive sprocket 34 and the metering auger 24 is driven by a sprocket 35. Any suitable source of power may be provided for rotating the sprockets 34 and 35 continuously during a feeding operation and for intermittently driving the sprocket 30 to rotate container 11.

Figure 3:
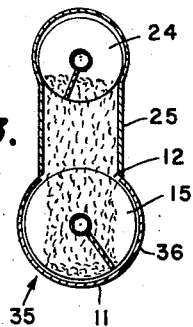
FIG. 3 is a transverse vertical section taken on the line 3—3 of FIG. 2 looking in the direction of the arrows.
Figure 4:
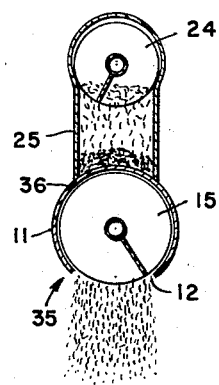
FIG. 4 is a view similar to FIG. 3 but showing the feed container of the apparatus in dumping position.

For closing the discharge outlet 28 of box 25 during a dumping operation of the feeder, valve means 35 is provided comprising an end 36 of container 11 and beneath chamber 25. When the slot 12 in the container is located in an "up" position as shown in FIG. 3, the feed coming from the hopper 20 may pass freely to the auger 15 and end 36 of the container. However, when the container 11 rotates, to dumping position as shown in FIG. 4, the discharge outlet 28 of the container is closed off by the body of container 11 and material is prevented from entering the container when the feeder is dumping. The closing off of box 25 with each dumping of container 11 produces an advantageous result.

When the container 11 is in the position shown in FIG. 4 and box 25 is closed, the metering auger 24 continues to operate and withdraw feed from the hopper 20. This feed accumulates and builds up in box 25 until container 11 returns to its original starting position with the slot 12 "up" as shown in FIG. 3. Thus, when the feeder is dumping, a charge of material is accumulated in box 25 which subsequently drops into container 11 as soon as discharge outlet 28 opens. As the auger 15 moves the feed along the length of the container, the stream has a charge at its head. This charge gradually decreases as the terminal end of the feeder is approached and fills in the remote sections of the feeder. This filling in tends to overcome the tapering problem at the remote end of the feeder when the overall length of the apparatus is substantial.

Figure 2:
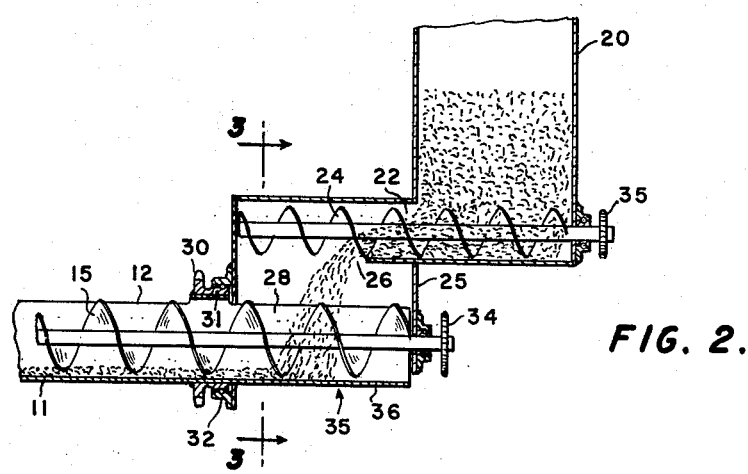
FIG. 2 is a fragmentary, longitudinal, vertical section of the feeder.

As noted from FIGS. 2-4, the size of valve box 25 is substantial. Such size is related to the metering rate of auger 24 and the time required for container 11 to rotate one revolution whereby the box does not become full when feed is being accumulated. This eliminates possible plugging problems.

Instead of providing a rotatable container 11, a fixed container with a drop bottom could also be employed or other means to achieve simultaneous discharge. Also, using the end 36 of the container as a valve is merely exemplary. Other and separate well known valve means can be employed if desired.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described my invention what I claim is:

1. A fill and dump device for feeding hogs and other stock animals comprising an elongated horizontally extending container, means supporting said container, conveyor means for distributing feed deposited in one end of said container along the length of the container, said container having a longitudinal opening for the dumping of feed, means controlling the dumping of feed through said opening, a feed supply hopper, a valve box having an inlet communicating with said hopper and an outlet to said container, metering means for withdrawing feed from said hopper and discharging the feed into said box, the discharged feed being adapted to pass through the box and into said container, and valve means for opening and closing said box outlet whereby the outlet may be left opened to allow passage of feed through the box while feed is being distributed by said conveyor means and closed with the metering means operating when said controlling means dumps feed through said opening, the feed building up in said box when said outlet is closed and providing an initial charge of material when the outlet is next opened for a subsequent distribution of feed in the container.

2. A fill and dump device for feeding hogs and other stock animals as recited in claim 1 wherein the size of said box is such relative to the discharge rate of said metering means and the time of a dumping of said container that during dumping said box is not filled.

3. A fill and dump device for feeding hogs and other stock animals comprising an elongated horizontally extending container supported for rotation about its longitudinal axis, conveyor means for distributing feed deposited in one end of said contained along the length of the container, said container one end having a bottom portion, said container having a longitudinal discharge opening positionable in an up location when feed is being distributed and rotatable to a down location to discharge feed from the container, a feed supply hopper, a valve box having an inlet communicating with said hopper and an outlet to said container, metering means for continuously withdrawing feed from said hopper and discharging the feed into said box, the discharged feed being adapted to pass through the box and into said container when the container opening is in said up location, and said bottom portion serving as a valve means for closing said box outlet when said container opening is in said down location, feed from said metering means building up in said box when the container is dumping and providing an initial charge of material when the container opening returns to the up location.

References Cited by the Examiner
UNITED STATES PATENTS

| | | | |
|---|---|---|---|
| 2,027,958 | 1/36 | Carter | 198—64 |
| 2,569,039 | 9/51 | Berthelot | 198—64 |
| 2,940,639 | 6/60 | Winter | 222—60 |
| 3,001,633 | 9/61 | Heitshu | 119—52 |
| 3,026,845 | 3/62 | Winter | 119—52 |
| 3,037,611 | 6/62 | Majorwicz | 119—52 |
| 3,111,115 | 11/63 | Best | 119—52 |
| 3,115,117 | 12/63 | Brelsford | 119—52 |
| 3,116,715 | 1/64 | Krumheuer | 119—52 |
| 3,125,990 | 3/64 | Van Peursem et al. | 119—52 |

SAMUEL KOREN, *Primary Examiner.*

ALDRICH F. MEDBERY, *Examiner.*